(12) United States Patent
Xu

(10) Patent No.: US 11,371,908 B2
(45) Date of Patent: Jun. 28, 2022

(54) WIND TUNNEL TESTING DEVICE FOR TORSIONAL-VERTICAL COUPLED FREE VIBRATION WITH ADJUSTABLE FREQUENCY RATIO

(71) Applicant: DALIAN UNIVERSITY OF TECHNOLOGY, Liaoning (CN)

(72) Inventor: Fuyou Xu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 17 days.

(21) Appl. No.: 17/263,841

(22) PCT Filed: Mar. 6, 2020

(86) PCT No.: PCT/CN2020/078136
§ 371 (c)(1),
(2) Date: Jan. 27, 2021

(87) PCT Pub. No.: WO2021/155617
PCT Pub. Date: Aug. 12, 2021

(65) Prior Publication Data
US 2021/0247266 A1    Aug. 12, 2021

(30) Foreign Application Priority Data
Feb. 6, 2020    (CN) .......................... 202010081552.5

(51) Int. Cl.
*G01M 9/04*    (2006.01)
(52) U.S. Cl.
CPC ................... *G01M 9/04* (2013.01)

(58) Field of Classification Search
CPC .................................. G01M 9/04; G01M 9/08
See application file for complete search history.

(56) References Cited

U.S. PATENT DOCUMENTS 10,837,864 B2 *    11/2020    Xu .......................... G01M 9/08
10,866,159 B2 *    12/2020    Xu ........................ G01M 9/062
(Continued)

FOREIGN PATENT DOCUMENTS

| CN | 102146980 A | 8/2011 |
| CN | 108225715 A | 6/2018 |

(Continued)

*Primary Examiner* — Freddie Kirkland, III
(74) *Attorney, Agent, or Firm* — Muncy, Geissler, Olds & Lowe, P.C.

(57) ABSTRACT

The invention discloses a coupled free vibration wind tunnel testing device with adjustable frequency ratio of torsional-vertical vibration, belonging to the technical field of bridge wind tunnel testing device. The device includes rigid testing model, lightweight rigid rods, lightweight rigid circular hubs, thin strings, linear tensile springs, carbon fiber ropes, and lightweight small hubs. The invention adjusts the torsional stiffness of the system by conveniently changing the diameter of the small hub, the diameter and length of the carbon fiber rope, etc. The device has the advantages of simple structure, convenient installation and avoiding the previous tedious work. It can achieve a variety of torsional-vertical vibration frequency ratio testing conditions by using only one diameter large hub. It can not only greatly save the time of replacing the large hub, but also facilitate the realization of higher torsional-vertical vibration frequency ratio testing conditions which are difficult to achieve by the previous methods.

3 Claims, 1 Drawing Sheet

(56) References Cited

U.S. PATENT DOCUMENTS

| | | | | |
|---|---|---|---|---|
| 10,890,508 B2* | 1/2021 | Xu | ....................... | G01M 5/0008 |
| 10,900,865 B2* | 1/2021 | Xu | ........................... | G01M 9/04 |
| 11,293,832 B2* | 4/2022 | Xu | ........................ | G01M 7/027 |
| 2019/0219475 A1* | 7/2019 | Xu | ........................... | G01M 7/06 |
| 2020/0072699 A1* | 3/2020 | Xu | ........................... | G01M 7/06 |
| 2020/0232875 A1* | 7/2020 | Xu | ........................ | G01M 9/062 |
| 2020/0232876 A1* | 7/2020 | Xu | ........................... | G01M 9/02 |
| 2021/0172830 A1* | 6/2021 | Xu | ........................... | G01M 7/00 |

FOREIGN PATENT DOCUMENTS

| | | |
|---|---|---|
| CN | 108414186 A | 8/2018 |
| JP | 09210839 A | 8/1997 |
| JP | 2001041846 A | 2/2001 |

* cited by examiner

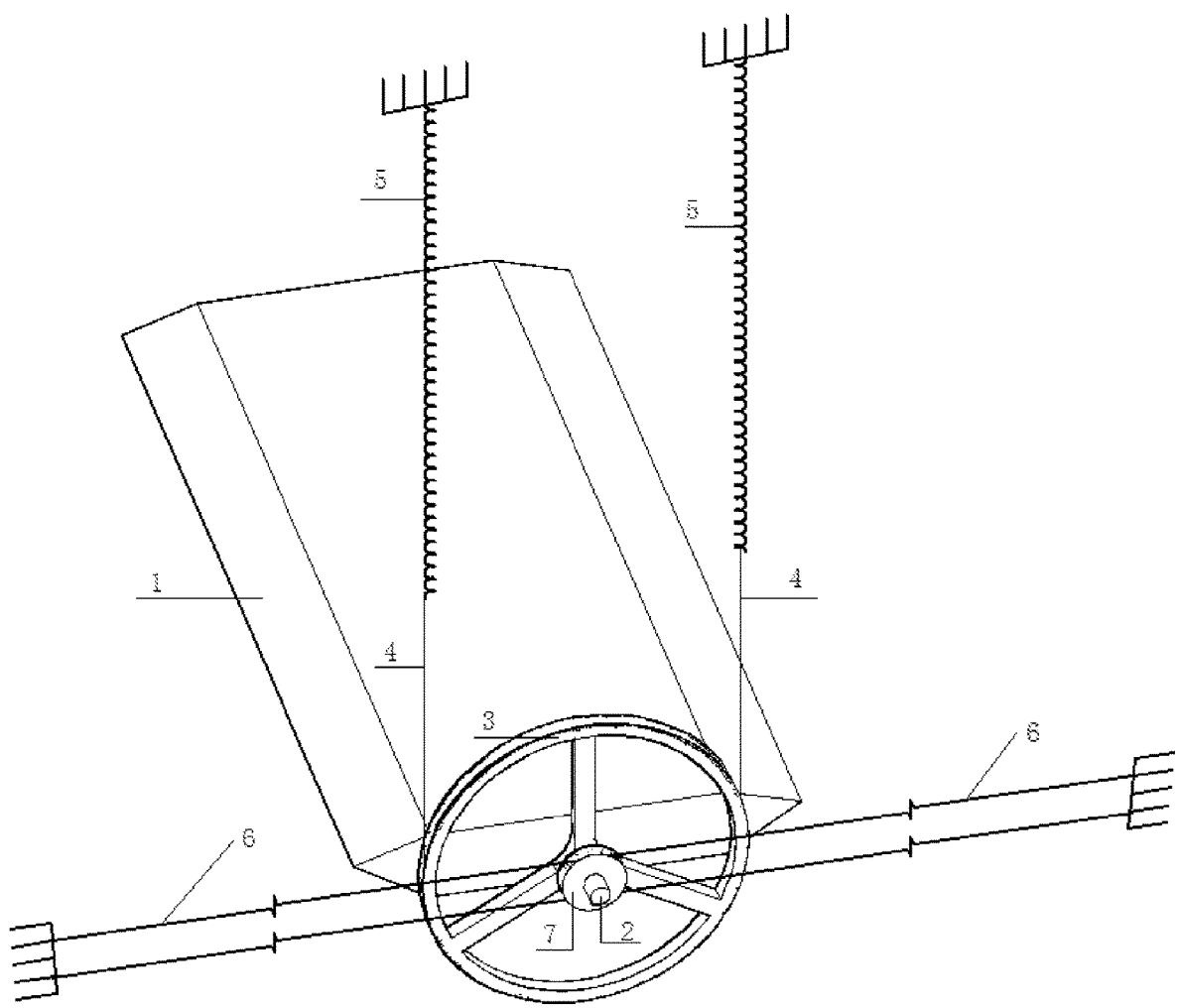

WIND TUNNEL TESTING DEVICE FOR TORSIONAL-VERTICAL COUPLED FREE VIBRATION WITH ADJUSTABLE FREQUENCY RATIO

TECHNICAL FIELD

The invention belongs to the technical field of bridge wind tunnel testing device, and relates to a wind tunnel testing device for torsional-vertical coupled free vibration with adjustable frequency ratio, which can realize large-amplitude torsional-vertical coupled free vibration of bridge rigid model, ensure linear stiffness of vertical and torsional modes, and conveniently adjust the frequency ratio between torsional and vertical modes. The system includes linear vertical tensile springs, rigid deck model, large-diameter lightweight rigid circular hubs fixed at both ends of the model, high-strength thin strings connecting the springs and the hubs, small-diameter lightweight rigid circular hubs, and carbon fiber strings. The large-amplitude torsional-vertical coupled free vibration of the bridge model can be transformed into the vertical free deformations of linear springs. The linear vertical and torsional stiffness of the system can be realized by the linear tensile stiffness of springs and rigid circular hubs. The torsional stiffness can be achieved by adjusting the diameter of the small hubs and the tensile stiffness of the carbon fiber strings, which effectively solves the difficulty of changing the frequency ratio of torsional and vertical modes in previous testing methods. For a given testing case, during the large-amplitude coupled vibration, the mass and mass inertia of the system keep unchanged, and the tensile stiffness of springs and carbon fiber strings remain unchanged, so the vertical translational frequency and rotational frequency around the hub centers keep constants.

BACKGROUND

The torsional-vertical coupled free vibration method of bridge rigid model is one major method for vibration (vortex-induced vibration, buffeting, galloping, flutter) measurement and identification of flutter derivatives in wind tunnel tests. In the past, the large-amplitude vertical-torsional coupled free vibration device for wind tunnel test consists of vertical springs, high-strength thin strings connected with hubs and springs, and high-strength thin strings (for constraining the lateral mode). The apparatus is very simple and easy to be realized. In order to satisfy the requirements of research, the wind tunnel test of large-amplitude coupled free vibration usually needs a variety of torsional-vertical vibration frequency ratios. In the past, the torsional stiffness and torsional-vertical vibration frequency ratio can be adjusted by using hubs with different diameters. The shortcomings include: the testing work is cumbersome, it is difficult to make hubs with very large diameters, and it is easy to cause the system making it unfeasible due to overload, and the cost is increased by making hubs of different sizes.

SUMMARY

The invention can solve the following technical problem: In order to satisfy the requirement of large-amplitude coupled free vibration test of bridge and other structural member segment models with various torsional-vertical frequency ratios in wind tunnel test, a free vibration testing device is provided to quickly and effectively adjust the torsional-vertical frequency ratio of the experimental system.

The technical solution of the invention:

A torsional-vertical coupled free vibration wind tunnel testing device with adjustable frequency ratio, includes rigid testing model 1, lightweight rigid rods 2, lightweight rigid circular hubs 3, thin strings 4, linear tensile springs 5, carbon fiber ropes 6, and lightweight small hubs 7; The lightweight rigid rods 2 are fixed at both ends of the rigid testing model 1. The lightweight rigid rods 2 are vertically passed through and fixed with the centers of the lightweight rigid circular hubs 3 and lightweight small hubs 7 to ensure that the torsional center line of the rigid testing model 1 is collinear with the axis of the lightweight rigid rods 2 and the center lines of the lightweight rigid circular hubs 3 and lightweight small hubs 7; The lightweight rigid circular hub 3 with groove is surrounded by the thin string 4. One end of the thin string 4 is fixed at the bottom of the lightweight rigid circular hub 3, and the other end of the thin string 4 is connected with the lower end of the linear tensile spring 5. The carbon fiber rope 6 is wounded in the groove of the lightweight small hub 7; During the torsional-vertical coupled free vibration, only relative rolling occurs between the lightweight rigid circular hubs 3 and the thin strings 4, and between the lightweight small hubs 7 and the carbon fiber ropes 6; The carbon fiber ropes 6 and the linear tensile springs 5 provide torsional stiffness at the same time; Because the diameter of lightweight small hub 7 is much smaller than that of the lightweight rigid circular hub 3, and the carbon fiber ropes 6 have enough tensile stiffness, the carbon fiber ropes 6 can limit the lateral vibration; During the torsional-vertical coupled free vibration of rigid testing model 1, the thin strings 4 drive the linear tensile springs 5 to move vertically up and down, and the linear tensile springs 5 only produce vertical deformation without any tilt; The vertical stiffness of the system is determined by the tensile stiffness of the linear tensile springs 5, and the torsional stiffness of the system is determined by the tensile stiffness of the linear tensile springs 5 and carbon fiber ropes 6, and the diameter of the lightweight rigid circular hubs 3 and the lightweight small hubs 7; The overall torsional stiffness of the system can be adjusted by changing the diameter of the lightweight small hubs 7 and the stiffness of the carbon fiberropes 6 (which can be easily adjusted by the diameter, number and length), so as to achieve different torsional-vertical vibration frequency ratios.

The diameter of lightweight small hub 7 is selected according to the torsional frequency to be achieved and it is generally in the range of 3 cm to 5 cm. The lightweight small hub 7 has the characteristics of light weight and high strength.

The carbon fiber rope 6 has the characteristics of light weight, high strength, linear elasticity and low elastic modulus; the pretension of the carbon fiber rope 6 needs to ensure that the carbon fiber rope 6 is always in the linear tension state during the torsional vibration process; The torsional stiffness of the system can be adjusted by changing the number, diameter and length of the carbon fiber rope 6, which is more convenient than replacing the lightweight small hub 7 with different diameters. The rope is not necessarily limited to the carbon fiber rope; instead, any ropes with the characteristics of light weight, high strength and linear elasticity, are applicable.

The advantages of the invention: Compared with the previous large-amplitude torsional-vertical coupled free vibration wind tunnel testing device, the new device can change the torsional stiffness and the torsional-vertical frequency ratio of the system by changing the diameter of the small hub, as well as the number, diameter and length of the carbon fiber ropes. The achievable range of torsional-vertical frequency ratio is very wide, basically unlimited.

DESCRIPTION OF THE DRAWINGS

The sole FIGURE is a schematic diagram of torsional-vertical coupled free vibration wind tunnel testing device with adjustable frequency ratio.

In the FIGURE: 1 rigid testing model; 2 lightweight rigid rod; 3 lightweight rigid circular hub; 4 thin string; 5 linear tensile spring; 6 carbon fiber rope; 7 lightweight small hubs.

DETAILED DESCRIPTION

The specific implementation of the present invention will be described in detail below in conjunction with the technical solution and the drawings.

As shown in the sole FIGURE, a coupled free vibration wind tunnel testing device with adjustable frequency ratio of torsional-vertical vibration, includes rigid testing model 1, lightweight rigid rods 2, lightweight rigid circular hubs 3, thin strings 4, linear tensile springs 5, carbon fiber ropes 6, and lightweight small hubs 7; The lightweight rigid rods 2 are fixed at both ends of the rigid testing model 1. The lightweight rigid rods 2 are vertically passed through the centers of the lightweight rigid circular hubs 3 and lightweight small hubs 7 and fixed with them in turn to ensure that the torsional center line of the rigid testing model 1 is collinear with the axis of the lightweight rigid rods 2 and the center lines of the lightweight rigid circular hubs 3 and lightweight small hubs 7; The lightweight rigid circular hub 3 with groove is surrounded by the thin string 4. One end of the thin string 4 is fixed at the bottom of the lightweight rigid circular hub 3, and the other end of the thin string 4 is connected with the lower end of the linear tensile spring 5. The carbon fiber rope 6 is wound in the groove of the lightweight small hub 7; During the torsional-vertical coupled free vibration, only relative rolling occurs between the lightweight rigid circular hubs 3 and the thin strings 4, and the lightweight small hubs 7 and the carbon fiber ropes 6; The carbon fiber ropes 6 and the linear tensile springs 5 provide torsional stiffness at the same time; During the torsional-vertical coupled free vibration of rigid testing model 1, the thin strings 4 drive the linear tensile springs 5 to move vertically up and down; The diameter of the lightweight small hub 7 and the diameter, number and length of the carbon fiber rope 6 can be easily adjusted to achieve different torsional-vertical vibration frequency Ratios.

The invention claimed is:

1. A coupled free vibration wind tunnel testing device with adjustable frequency ratio of torsional-vertical vibration, wherein the coupled free vibration wind tunnel testing device includes rigid testing model, lightweight rigid rods, lightweight rigid circular hubs, thin strings, linear tensile springs, carbon fiber ropes, and lightweight small hubs; the lightweight rigid rods are fixed at both ends of the rigid testing model; the lightweight rigid rods are vertically passed through the centers of the lightweight rigid circular hubs and lightweight small hubs and fixed with them in turn to ensure that the torsional center line of the rigid testing model is collinear with the axis of the lightweight rigid rods and the center lines of the lightweight rigid circular hubs and lightweight small hubs; the lightweight rigid circular hub with groove is surrounded by the thin string; one end of the thin string is fixed at the bottom of the lightweight rigid circular hub, and the other end of the thin string is connected with the lower end of the linear tensile spring; the carbon fiber rope is wound in the groove of the lightweight small hub; during the torsional-vertical coupled free vibration, only relative rolling occurs between the lightweight rigid circular hubs and the thin strings, and the lightweight small hubs and the carbon fiber ropes; the carbon fiber ropes and the linear tensile springs provide torsional stiffness at the same time; because the diameter of lightweight small hub is much smaller than that of the lightweight rigid circular hub, the tensile stiffness of carbon fiber rope plays a lateral limiting role.

2. The torsional-vertical coupled free vibration wind tunnel testing device with adjustable frequency ratio according to claim 1, wherein the diameter of lightweight small hub is selected according to the torsional frequency to be achieved and it is in the range of 3 cm to 5 cm.

3. The torsional-vertical coupled free vibration wind tunnel testing device with adjustable frequency ratio according to claim 1, wherein the pretension of the carbon fiber rope needs to ensure that the carbon fiber rope is always in the linear tension state during the torsional vibration process; the torsional stiffness of the system is adjusted by changing the number, diameter and length of the carbon fiber rope.

* * * * *